United States Patent
Karlsson

(10) Patent No.: US 8,290,974 B2
(45) Date of Patent: Oct. 16, 2012

(54) SYSTEM FOR HANDLING GRAPHICS

(75) Inventor: Tomas Karlsson, Råneå (SE)

(73) Assignee: Agency 9AB, Lulea (SE)

( * ) Notice: Subject to any disclaimer, the term of this patent is extended or adjusted under 35 U.S.C. 154(b) by 266 days.

(21) Appl. No.: 12/668,132

(22) PCT Filed: May 29, 2008

(86) PCT No.: PCT/SE2008/050629
§ 371 (c)(1),
(2), (4) Date: Jan. 28, 2010

(87) PCT Pub. No.: WO2009/008808
PCT Pub. Date: Jan. 15, 2009

(65) Prior Publication Data
US 2010/0325176 A1  Dec. 23, 2010

(30) Foreign Application Priority Data
Jul. 10, 2007  (SE) .................................. 0701674

(51) Int. Cl.
*G06F 17/30* (2006.01)
(52) U.S. Cl. ........................ 707/758; 707/802
(58) Field of Classification Search ............. 707/705, 707/802, 803, 806, 758
See application file for complete search history.

(56) References Cited

U.S. PATENT DOCUMENTS

| | | | | |
|---|---|---|---|---|
| 5,995,756 A | * | 11/1999 | Herrmann | 717/178 |
| 7,103,681 B2 | * | 9/2006 | Coulombe | 709/246 |
| 2003/0097383 A1 | * | 5/2003 | Smirnov et al. | 707/204 |
| 2005/0021834 A1 | * | 1/2005 | Coulombe | 709/236 |
| 2005/0024376 A1 | * | 2/2005 | Gettman et al. | 345/582 |
| 2005/0086318 A1 | * | 4/2005 | Aubault | 709/213 |
| 2005/0192922 A1 | * | 9/2005 | Edlund et al. | 707/1 |
| 2007/0146505 A1 | * | 6/2007 | Billerbeck | 348/231.6 |

FOREIGN PATENT DOCUMENTS

WO  WO2004/112296 A2  12/2004

OTHER PUBLICATIONS

Thibaud, Remy, et al., "Target3D: Interactive Visualization over the World Wide Web," Proceedings of the Third International Conference on Web Information Systems Engineering (Workshops), 2002, p. 30-39.
International Search Report for PCT/SE2008/0050629, dated Oct. 20, 2008.
International Preliminary Report on Patentability for PCT/SE2008/050629, dated Jan. 6, 2009.

* cited by examiner

*Primary Examiner* — Son T Hoang
(74) *Attorney, Agent, or Firm* — Moore & Van Allen PLLC; W. Kevin Ransom

(57) ABSTRACT

A primary user interface is configured to receive uploaded data sets stored in a primary memory means each describing a 3D graphics data structure in a respective source format. A secondary user interface receives request messages from user clients and in response, provides the clients access to specified data sets. Upon receipt of a request message, an examining entity identifies a graphics rendering capability of the client originating the message, and investigates whether or not the client is equipped with a viewer capable of visualizing the requested data set. A viewer database contains software modules adapted to implement at least two different viewers, where each viewer is configured to visualize the stored data sets on at least one type of client. If the examining entity finds that the client is incapable of visualizing the requested data set, a controller entity forwards an adequate software module to the user client that is adapted to implement a viewer configured to visualize the requested data set on this client.

17 Claims, 2 Drawing Sheets

SYSTEM FOR HANDLING GRAPHICS

FIELD OF THE INVENTION

The present invention relates generally to distribution of computer graphics data. More particularly the invention relates to systems, methods, computer programs, and/or computer readable media for visualizing computer graphics in at least one one user client (C21a, C21b, C22a, C2na).

BACKGROUND OF THE INVENTION PRIOR ART

Modern computers are normally equipped with Graphics Processing Units (GPUs)/Visual Processing Units (VPUs) which enable processing and display of complex three-dimensional (3D) content. Generally, the Internet and various forms of wireless access networks associated thereto have rendered it comparatively easy for computer users to access and distribute data.

However, due to the wide variety of graphics viewers and client platforms and the fact that the graphics data must be tailored to each viewer/platform, it is highly complicated for a digital artist to publish his/her works to a general audience based on the present technology. Namely, providing a respective version of a given work, where each version is adapted to a certain existing (and future) user environment is an intricate, cumbersome and perhaps even impossible task. Moreover, a mobile client, for instance implemented in a cell phone, typically has severely limited graphics capabilities compared to those of a workstation. Hence, the graphics data contents might have to be very plain to ensure that it can be visualized on all types of clients.

SUMMARY OF THE INVENTION

The object of the present invention is therefore to solve the above problems, and thus offer a solution which enables users in the form of digital artists to publish their works to a general public in an efficient and straightforward manner.

The object of the invention is also to provide user access to the works of digital artists, such that for example these works may be embedded, or by other means be incorporated, into webpages and similar environments controlled by a user/customer.

According to one aspect of the invention, the object is achieved by the system as initially described, wherein the system includes a viewer database, an examining entity and a controller entity. The viewer database contains software modules adapted to implement at least two different viewers. Here, each viewer is configured to visualize the stored data sets on at least one type of client. The examining entity is configured to identify a respective graphics rendering capability of each user client from which a request message has been received. For instance, the graphics rendering capability may reflect a processing capacity and/or a memory capacity of the user client. Moreover, for each graphics-requesting client, the examining entity is configured to investigate whether or not the client is equipped with a viewer capable of visualizing the data set requested by the client. The controller entity is configured to forward an adequate software module to the user client, if the examining entity finds that the client is incapable of visualizing the requested data set. The adequate software module is a module adapted to implement a viewer, which is configured to visualize the requested data set on this client.

This system is advantageous because it relieves the artist from compatibility concerns. Thus, he/she can focus entirely on the creative aspects of the work, and produce the graphics contents in the environment being most suited for this purpose. The proposed system may be configured to operate smoothly with all Java-enabled web browsers, such as Firefox, Internet Explorer, Safari and Opera. Moreover, the system may support any type of operating system, such as Microsoft Windows XP, 2000 and Vista, Apple OSX, Linux, Solaris and UNIX.

According to one preferred embodiment of this aspect of the invention, the system includes a conversion entity configured to convert each data set stored in the primary memory means into a modified data set having a target format adapted to be visualized via at least one type of viewer installed in at least one of the user clients. Furthermore, in response to a received request message, the examining entity is configured to investigate whether or not the user client which originated the request message is capable of handling the source format of the requested data set. If it is found that the user client is incapable of handling the source format, the examining entity is configured to trigger the conversion entity to convert the requested data set into a modified data set of a target format which the user client can handle. Hence, the source data is converted on an on-demand basis.

According to another preferred embodiment of this aspect of the invention, the system includes a secondary memory means. The controller entity is further configured to cause a respective target-format version of any generated modified data set to be stored in the secondary memory means. Thus, the secondary memory means progressively builds a library of various converted versions of source data, such that this data can be reused if requested again in the future.

According to yet another preferred embodiment of this aspect of the invention, if the examining entity finds that the user client is incapable of visualizing the requested data set, the controller entity is configured to execute the following steps before triggering the conversion entity to convert the requested data set: (i) search the secondary memory means for a modified data-set version of the requested data set which version matches the graphics rendering capability of the user client, and if such a version is found, (ii) inhibit conversion of the requested data set, (iii) cause the modified data set to be read out from the secondary memory means, and (iv) cause the modified data set to be forwarded to the user client. Thus, any unnecessary re-conversions the source data are avoided.

According to still another preferred embodiment of this aspect of the invention, the source format is based on XML (eXended Markup Language), i.e. the 3D graphics structure is described by one or more XML files. The target format of the modified data set, in turn, may be a binary format representing a compressed version of at least one XML-file. Preferably, if the user client has sufficient capabilities, the conversion entity is configured to generate the modified data set in real time. Hence, the client is provided with prompt and convenient access to the 3D data structure.

According to a further preferred embodiment of this aspect of the invention, it is presumed that user client has a relatively limited graphics rendering capability. Here, the control entity is configured to cause symbolic graphics to be shown via a viewer in the user client in response to user commands pertaining to desired manipulations of the requested data set. The symbolic graphics schematically represents the 3D graphics data structure of the requested data set (e.g. as a primitive box, or a sphere). The control entity is further configured to cause the conversion entity to generate the modified data set in response to a confirmation command from the user client. The control entity is then configured to cause the modified data set to be forwarded the user client. The modified data set here represents a manipulation of the requested data set being in agreement with a manipulation thereof indicated by the user commands and authorized by the confirmation command. Thereby, the graphics data structures can be accessed in a user-friendly manner also via clients having relatively limited graphics rendering capabilities.

According to a still another preferred embodiment of this aspect of the invention, the control entity is configured to: cause the conversion entity to generate the modified data set in the form of a video stream and/or static image data representing the requested data set, and forward the modified data set to the user client. Thereby, the graphics data structures can be visualized also in clients with very limited graphics rendering capabilities.

According to another aspect of the invention, the object is achieved by the initially described method, involving the step of identifying a respective graphics rendering capability of each user client from which a request message has been received. For each client from which a request message has been received, the method further involves investigating whether or not the client is equipped with a viewer capable of visualizing the data set requested by the client. Here, if it is found that the client is incapable of visualizing the requested data set, an adequate software module is forwarded to the user client. The adequate software module is adapted to implement a viewer, which is configured to visualize the requested data set on this client. The advantages of this method, as well as the preferred embodiments thereof, are apparent from the discussion hereinabove with reference to the proposed system.

According to a further aspect of the invention the object is achieved by a computer program, which is loadable into the internal memory of a computer, and includes software for controlling the above proposed method when said program is run on a data-processing apparatus.

According to another aspect of the invention the object is achieved by a computer readable medium, having a program recorded thereon, where the program is to control a data-processing apparatus to perform the above proposed method.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED
EMBODIMENTS OF THE INVENTION

Figure 1:
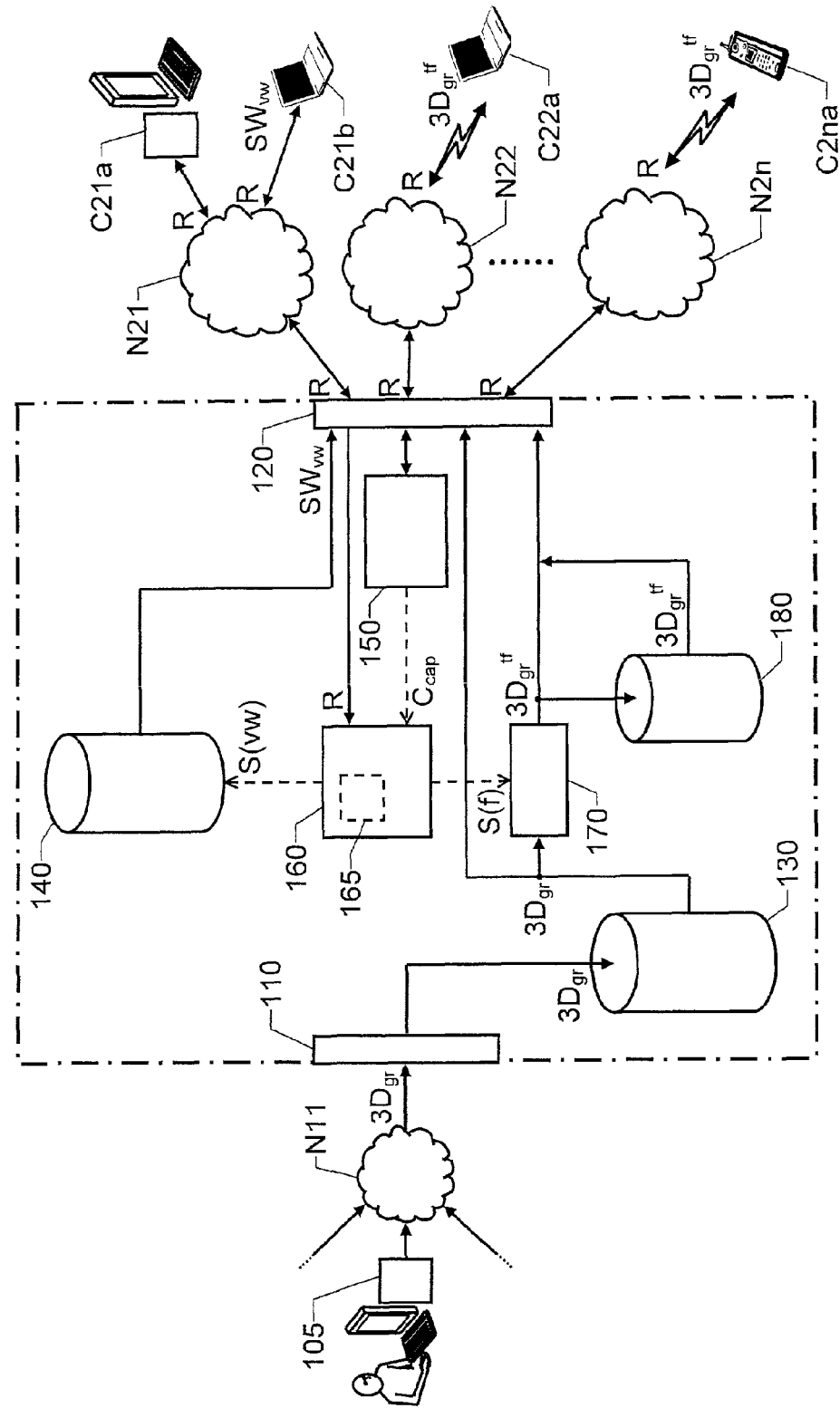
FIG. 1 shows an overview of a computer system according to one embodiment of the invention.

We refer initially to FIG. 1, which shows an overview of a computer system according to one embodiment of the invention. The system includes a primary user interface 110, a secondary user interface 120, a primary memory means 130, a viewer database 140, an examining entity 150 and a controller entity 160.

The primary user interface 110 is configured to receive data sets $3D_{gr}$ from at least one user terminal 105. Here, each data set $3D_{gr}$ describes a three-dimensional graphics data structure in a respective source format, e.g. COLLADA (Collaborative Design Activity) or X3D (the ISO standard for real-time 3D computer graphics). Hence, digital artists and other contents creators may upload their works in the form of 3D models via one or more networks N11 connected to the primary user interface 110.

The primary memory means 130 is configured to store the data sets $3D_{gr}$, and the secondary user interface 120 is configured to be connected to user clients, here exemplified by C21a, C21b, C22a and C2na respectively. In response to a request messages R from the user clients C21a, C21b, C22a and C2na, the system is adapted to provide each client with access to at least one requested data set of the data sets $3D_{gr}$ stored in the primary memory means 130. This process will be discussed in detail below, however, generally the proposed system enables users (i.e. operators of the clients) to add 3D models to their webpages irrespective of which hosting service they employ. Moreover, once included in a webpage, any connecting device with web capabilities will be capable of visualizing the 3D model, at least to some extent, depending on the capabilities of the connecting device.

The viewer database 140 contains a number of software modules $SW_{vw}$ which each is adapted to implement a respective viewer. Each viewer, in turn, is configured to visualize the stored data sets $3D_{gr}$ on at least one type of client C21a, C21b, C22a or C2na.

It is presumed that each client C21a, C21b, C22a and C2na is adapted to generate request messages R specifying a respective 3D model (or other three-dimensional graphics data structure) which is stored in the primary memory means 130. Furthermore, it is desirable that the clients C21a, C21b, C22a and C2na may gain information about which 3D models that are selectable, for instance via a listing on a web page. Preferably, such a web page also specifies parameters and/or features of the models, such as general outline/appearance, width and height of a viewport to the model and background color. Thus, in addition to identifying a given model, the request messages R may also designate one or more of said parameters and/or features. For example, a user client may generate the request message R by clicking on a particular web link on a webpage controlled by the present system.

Nonetheless, in response to a received request message R, the examining entity 150 is configured to identify a graphics rendering capability $C_{cap}$ of the user client that originated the request message R, say client C21b implemented by a laptop computer which is connected to the secondary user interface 120 via a wired network N21 (e.g. the Internet). The graphics rendering capability $C_{cap}$ may reflect a processing capacity and/or a memory capacity of the user client C21a.

In response to the request message R, the examining entity 150 is further configured to investigate whether or not the client C21b is equipped with a viewer that is capable of visualizing the requested data set $3D_{gr}$. If the examining entity 150 finds that the client C21b is incapable of visualizing the requested data set $3D_{gr}$, the controller entity 160 is configured to forward an adequate software module $SW_{vw}$ from the viewer database 140 to the user client C21b. The controller entity 160 selects the adequate software module $SW_{vw}$ to be a module that is adapted to implement a viewer, which in turn, is configured to visualize the requested data set $3D_{gr}$ on the client C21b.

Moreover, after downloading, the controller entity 160 preferably prompts the client C21b to install the software module $SW_{vw}$. Subsequently, the client C21b may access the requested data set $3D_{gr}$ by means of the viewer implemented by the software module $SW_{vw}$.

According to one preferred embodiment of the invention, the system includes a conversion entity 170 configured to convert the format of the data set $3D_{gr}$ stored in the primary memory means 130 into a modified data set $3D_{gr}^{tr}$. The modified data set $3D_{gr}^{tr}$ has a target format, which is adapted to be visualized via a particular type of viewer installed in one or more user clients C21a, C21b, C22a and/or C2na. Such a conversion is advantageous because depending on processing and storage capacity, the clients C21a, C21b, C22a and C2na may have very different graphics rendering capabilities. The respective interconnecting network N21, N22 or N2n between a given client and the system may also cause various bandwidth limitations which may influence the client's capabilities to visualize 3D graphics data structures. Therefore, in response to a received request message R, the examining entity 150 is preferably configured to investigate whether or not the user client which originated the request message R is capable of handling the source format of the requested data set $3D_{gr}$.

Now, let us assume that the client originating the request message R resides on a laptop computer C22a or mobile telephone C2na which is connected to the secondary user interface 120 via at least one wireless network. This means that the client has comparatively limited capabilities to visualize 3D graphics data structures, especially in the latter case. Hence, it is likely that the examining entity 150 finds that the user client is incapable of handling the source format (i.e. typically an XML-file of COLLA-DA format which is relatively processing and memory demanding to handle). If so, the examining entity 150 is further adapted to trigger the conversion entity 170 to convert the requested data set $3D_{gr}$ into a modified data set $3D_{gr}^{tr}$. Here, of course, the modified data set $3D_{gr}^{tr}$ has a target format which the user client can handle, i.e. in this example the laptop client C22a or the mobile-phone client C2na respectively.

One optimization that can be made for mobile devices like C22a and C2na is to arrange a mesh data structure of the source format (e.g. COLLADA) in a manner being directly optimized for rendering. In COLLADA, the meshes are suitable for large and heavy content creation tools and CAD programs, however not particularly well adapted for rendering. Many mobile phones that support 3D rendering use the OpenGL ES specification, which is optimized to be used with structures having chunks of unique vertices. This means that there is exclusively one texture coordinate, one normal, etc per vertex. In COLLADA, on the other hand, several texture coordinates can be assigned to each vertex. Therefore, an unrolling process from COLLADA is not well suited for mobile devices with limited processing capabilities. Naturally, maintaining a source format of the data set $3D_{gr}$ is still interesting, since the unique mesh may be usable by a workstation viewer which provides editing capabilities.

3D objects with specified materials and textures may also be modified to match the rendering capabilities of less capable clients. If a light weight computer, e.g. a laptop computer or other mobile device, requests access R to a relatively large data set $3D_{gr}$, the data can be compressed by reducing the size of the texture, so that the modified data set $3D_{gr}^{tr}$ fits the memory capacity of the applicable platform.

Even relatively powerful user clients implemented on workstation platforms may require a modified data set $3D_{gr}^{tr}$ to provide a best possible user experience of the 3D graphics data structure. For example parsing a XML file may be up to more than three times slower than parsing a binary serialized version of the same file. Therefore, the target format of the modified data set $3D_{gr}^{tr}$ is preferably a binary format representing a compressed version of at least one XML file.

Further, provided that the user client has sufficient processing capacity and the interconnecting network N21, N22 or N2n provides adequate bandwidth, the conversion entity 170 is preferably configured to generate the modified data set $3D_{gr}^{tr}$ in real time. Namely, this enables the client with prompt and convenient access to the requested 3D data structure.

Although the client may have a resourceful CPU, this unit can be better adapted to handle some data formats than others. The operating system and its library structures may also determine which data format that constitutes an optimal serialized format for a given client. Furthermore, different 3D engines may have different preferred data layouts. Hence, the proposed examining and conversion entities 150 and 170 are useful tools in terms of supplying suitable viewers to all types of user clients.

According to another preferred embodiment of the invention, the system includes a secondary memory means 180. Moreover, whenever a particular target-format version of a modified data set $3D_{gr}^{tr}$ is generated for the first time, the controller entity 160 is configured to cause a copy of this data set $3D_{gr}^{tr}$ to be stored in the secondary memory means 180. Consequently, the controller entity 160 gradually builds up a library of pre-converted modified data sets $3D_{gr}^{tr}$ in the secondary memory means 180.

Additionally, if the examining entity 150 finds that the client, say C22a (implemented by a laptop computer which is connected to the secondary user interface 120 via a wireless access network N22), is incapable of visualizing the requested data set $3D_{gr}$, the controller entity 160 is preferably configured to execute the following procedure before triggering the conversion entity 170 to convert the requested data set $3D_{gr}$. First, the controller entity 160 searches the secondary memory means 180 for a modified data-set $3D_{gr}^{tr}$ version of the requested data set $3D_{gr}$, which version matches the graphics rendering capability $C_{cap}$ of the user client C22a. If such a version is found, the controller entity 160 inhibits conversion of the requested data set $3D_{gr}$. Instead, the controller entity 160 causes the modified data set $3D_{gr}^{tr}$ to be read out from the secondary memory means 180 and be forwarded to the user client C22a.

However, if no matching modified data-set $3D_{gr}^{tr}$ version of the requested data set $3D_{gr}$ is found in the secondary memory means 180, the conversion entity 170 is triggered to convert the requested data set $3D_{gr}$ into a modified data set $3D_{gr}^{tr}$ as described above. In connection therewith, the controller entity causes a copy of the modified data set $3D_{gr}^{tr}$ to be stored in the secondary memory means 180.

For efficient interaction with the user clients C21a, C21b, C22a and C2na and to enable a best possible content access for each client, the controller entity 160 is preferably adapted to implement a step-wise conversion scheme as outlined below.

Step 1: The examining entity 150 identifies the graphics rendering capabilities of the user client (i.e. the device which originated the request message R in respect of the data set $3D_{gr}$). The examining entity 150 also investigates whether or not the client is equipped with a viewer capable of visualizing the data set $3D_{gr}$ in its source format (e.g. a viewer supporting XML parsing). If the examining entity 150 finds that the client has such a viewer, the system forwards the data set $3D_{gr}$ to the client.

Step 2: If the examining entity 150 finds that the user client does not have a viewer capable of visualizing the data set $3D_{gr}$ in its source format, however the client has a viewer capable of visualizing an already modified version $3D_{gr}^{tr}$ of the data set $3D_{gr}$ which is stored in the secondary memory means 180, the system forwards the modified version $3D_{gr}^{tr}$ to the client. This may mean that instead of an XML file, a binary file compressed to fit the memory capacity of the client is forwarded to the client (preferably in real-time).

Step 3: As yet another alternative, the examining entity 150 may find that the user client neither has a viewer capable of visualizing the data set $3D_{gr}$ in its source format, or in an already modified version $3D_{gr}^{tr}$, however in a new modified version $3D_{gr}^{tr}$ thereof which can be generated by conversion entity 170. If this is the case, the controller entity 160 orders production of this modified version $3D_{gr}^{tr}$ of the requested data set $3D_{gr}$, and forwards that version $3D_{gr}^{tr}$ to the client.

Step 4: If also the test in step 3 fails, the controller entity 160 causes an adequate software module $SW_{vw}$ to be forwarded to the user client, where the adequate software module $SW_{vw}$ is adapted to implement a viewer configured to visualize the requested data set $3D_{gr}$ on this client. Then, the controller entity 160 causes a suitable data set to be sent to the client. Typically, this means that the client receives a modified data set-version $3D_{gr}^{tr}$ as described above.

For user clients having relatively limited graphics rendering capability, the 3D image may instead have to be rendered on the server side, i.e. in the proposed system. In such a case, the control entity 160 is preferably configured to cause symbolic graphics, for instance in the form of a primitive box or a sphere, to be shown via a viewer in the user client (e.g. the mobile telephone C22a) in response to user commands pertaining to desired manipulations of the requested data set $3D_{gr}$. Hence, the symbolic graphics schematically represent the three-dimensional graphics data structure of the requested data set $3D_{gr}$. Then, in response to a confirmation command from the user client, the control entity 160 causes the conversion entity 170 to generate a modified data set $3D_{gr}^{tr}$ that represents a version of requested data set $3D_{gr}$ which is modified in a manner defined by said user commands. Thereafter, the system forwards the modified data set $3D_{gr}^{tr}$ to the user client.

Thus, the client is provided with basic 3D capabilities. For example, a user may repose, move and navigate in primitive 3D world, and receive rendered high quality image from the server of a particular view. Consequently, it is rendered possible to interact in almost real-time with a 3D world via devices with almost no 3D rendering support, and/or very limited capabilities.

As a final fallback, the controller entity 160 may be configured to deliver a pre-generated image, or video stream, to the user client. Hence, in this case, the requested data set $3D_{gr}$ is represented by modified data set $3D_{gr}^{tr}$ in the form of a video stream and/or static image data. The controller entity 160 causes the conversion entity 170 to generate this data set $3D_{gr}^{tr}$, and forward it to the user client, e.g. the mobile telephone C22a.

Furthermore, the controller entity 160 is preferably associated with a computer readable medium 165 (e.g. a memory module) having a program recorded thereon. Said program, in turn, is adapted to make the controller entity 160 control above-described procedure.

Irrespective of the data format, it is generally preferable if the content stream delivered to the user clients C21a, C21b, C22a and C2na is encrypted to prevent copyright theft.

To further elucidate the invention, we will now exemplify how the proposed system may interact with a clients running on a workstation and a mobile device respectively.

If the user client connects to the system via a laptop computer having a web browser with Java enabled, the system will cause start-up of a Java applet in the user client. The Java applet is an extremely small software component, which is capable of detecting device capabilities and installed libraries. The Java applet thus checks the capabilities of the computer, such as its GPU, RAM, operating system and other parameters which may influence the graphics rendering capabilities. The Java applet also checks if the client is equipped with a viewer, and if so the version number that viewer. If no viewer is found to be available, the Java applet requests forwarding of a viewer that is deemed most suitable for the client based on gathered graphics rendering capabilities. If, however, a viewer was found, the Java applet searches the viewer database 140 for a possibly newer version of this viewer that better meets the client's capabilities. If such a viewer is available in the viewer database 140, the controller entity 160 causes forwarding thereof to the client, and thereafter prompts the client to install corresponding software module $SW_{vw}$.

Then, the Java applet requests a 3D model based on the request message R. Preferably, this involves supplying an identification tag to the controller entity 160, where the tag designates a version of the requested 3D model which meets the capabilities of client platform and its installed viewer.

Subsequently, based on the tag, the controller entity 160 retrieves 3D model from the primary memory means 130 or the secondary memory means 180. Here, we presume that the model is stored in an XML based file format. The controller entity 160 then matches the capabilities of the user client and the version of its viewer with a converter module. For a Java based viewer, we the 3D model is preferably supplied in a serialized format using serialization mechanism of Java. The serialization mechanism of Java can be regarded as a memory dump of the Java engine's internal data structure of a given application, or part thereof. This mechanism is advantageous because its binary representation matches exactly the data layout in memory when loaded in the JVM (Java Virtual Machine). Generally, a binary serialized file is desirable, since it is relatively fast to load, say up to three times faster than an equivalent COLLADA XML document.

A disadvantage with such serialization, however, is that a binary serialized file for one version of JVM may not be compatible with other versions of JVM. For example in Java, there is a break in compatibility between Java versions 1.5.0._06 and 1.5.0._07. Thus, the serialized file must be closely matched with the version of the JVM running on the user client, as well as with the version of the viewer used.

As mentioned above, the conversion entity 170 initially searches for a previously converted version of a requested data set $3D_{gr}$ using the same setup is applicable in the current case, in order to re-use possibly cached data. If no such version is available in the secondary memory means 180, the requested data set $3D_{gr}$ is read into a memory using the same version of the viewer and the same version of the connecting Java virtual machine as the connecting client. The 3D data structure is then serialized using Java's serialization mechanism to a binary file, the file is encrypted and sent to the viewer of the user client. This ensures fastest possible loading speed on the user client.

If the user client has a JVM version which is not supported by the conversion entity 170, the controller entity 160 uses a viewer with XML parsing capabilities on the client. Thereafter, an encrypted XML-based version of the requested data set $3D_{gr}$ is sent to the client's viewer. This file then decrypted and parsed by the viewer.

If the user client lacks Java altogether, then a fallback component is engaged. This component may be based on a Java script or Flash. In any case, the component requests the data set $3D_{gr}$ and returns a message to the controller entity 160 indicating the client lacks 3D capabilities. Based on the request message R, the desired 3D graphics data is identified in the primary memory means 130. The corresponding XML file is then sent to the conversion entity 170, which loads the XML file into a 3D viewer. If the file is animated, and the user client has video capabilities, the controller entity 160 preferably causes a video sequence of pre-rendered still images to be created. Thereafter, the video sequence is sent to the user client for display. Nevertheless, if the user client lacks video capabilities, the controller entity 160 preferably causes a still image of the desired 3D graphics data to be produced and forwarded to the client.

In mobile devices, there is currently no off-the-shelf solution that is directly embeddable inside an appropriate web browser. Therefore, it is proposed that a standalone viewer be used, which can be directly engaged in connection with the downloading of a requested data set $3D_{gr}$. Hence, the controller entity 160 is configured to detect if a user client implemented on a mobile device connects to a web page into which 3D graphics is embedded which originates from the proposed system.

The user client transmits data identifying the model of the mobile device. Based thereon, the controller entity 160 consults a database to determine the capabilities of the client, and which viewer that is best suited for this device. For example, if the user client runs on a Nokia Symbian S60 with OpenGL ES capabilities, a native Symbian application is preferably used as viewer. The controller entity 160 responds to the request message R by displaying a download link to the suitable viewer, and a direct link to a file of the relevant data set $3D_{gr}$. Here, the link is preferably displayed as still image of the 3D graphics model. It is further advantageous to converted any textures are to a mobile-adapted format, which is resized to fit the restrictions of the device in question. Moreover, meshes may be unrolled, and other optimizations of the file my be performed.

To view the 3D model represented by the data set $3D_{gr}$, the user needs to download and install the viewer on the client by clicking on the download link. The viewer is associated with a specific MIME-type. This means that all files associated with this mime type is automatically opened by the application. Provided that the viewer is installed and the user clicks on the link, the controller entity 160 responds with the correct MIME-type, and the file is downloaded and displayed in the viewer application.

A similar procedure is applicable to devices with only Java ME and JSR184. Here, however, instead of a Symbian-based viewer viewers based on Java ME and JSR184 is used. If no cached converted file exits in the secondary memory means 180, the controller entity 160 causes the conversion entity to the XML-based file form the primary memory means 140, and create an M3G-native file which meets the JSR184 specification.

Figure 2:
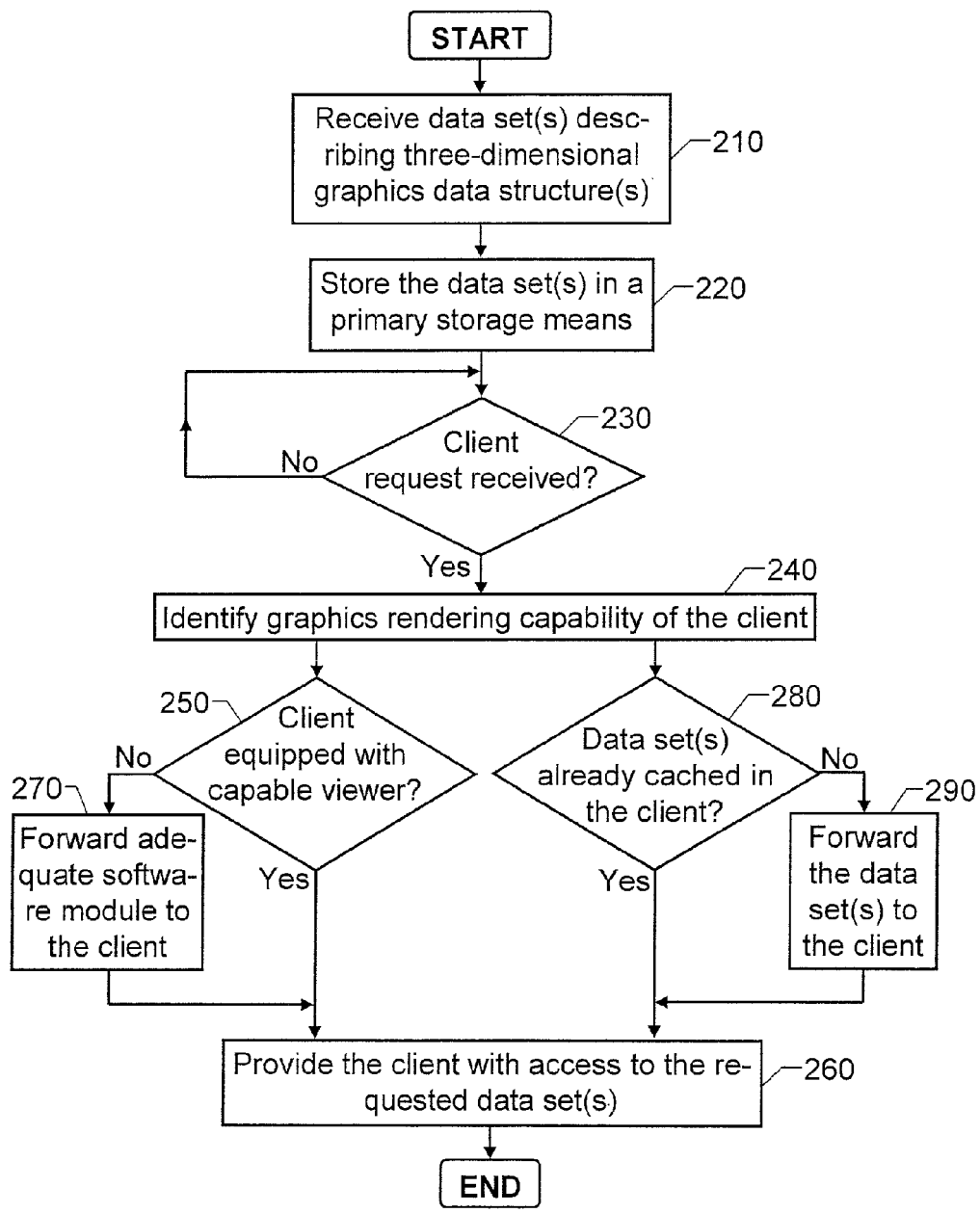
FIG. 2 illustrates, by means of a flow diagram, a general method of visualizing computer graphics according to the invention.

To sum up, the general method of visualizing computer graphics in user clients according to the invention will now be described with reference to the flow diagram in FIG. 2. For clarity, the flow diagram only elucidates one uploading of graphics and one downloading respectively.

An initial step 210 receives at least one data set which describes a three-dimensional graphics data structure in a respective source format. Then, a step 220 stores the data set(s) in a primary memory means of the computer system.

Subsequently, a step 230 checks whether or not a request message has been received from a user client in respect of any of the stored stores the data sets. If not, the procedure loops back and stays in step 230. Otherwise, a step 240 follows which identifies a respective graphics rendering capability of the user client from which the request message was been received.

Thereafter, a step 250 checks whether or not the user client is equipped with a viewer that is capable of visualizing the requested data set(s). If it is found that the client is capable of visualizing the requested data set, the procedure continues to a step 260. Otherwise, the procedure a step 270 follows, which forwards an adequate software module to the user client. The adequate software module is adapted to implement a viewer, which is configured to visualize the requested data set on the user client in question. Then, step 260 follows.

Step 260 provides the user client with access to the requested data set(s). After that, the procedure ends.

In a preferred embodiment of the invention, a step 280 after step 240 (e.g. parallel to step 250) investigates whether or not the at least one requested data set is already cached in the client. If so, the client can be provided with access to the data set(s) immediately based on the contents of the cache memory (i.e. the procedure continues to step 260). Otherwise, however, a step 290 forwards the requested data set(s) to the client as described above.

As mentioned earlier, the flow diagram in FIG. 2 presents a simplified version of the procedure implemented by the proposed system. For instance, in practice, steps 210 and 220 are executed repeatedly in a first uploading loop, and steps 230 through 270 (or 290) are executed repeatedly in a second down-loading loop essentially in parallel with the first loop.

All of the process steps, as well as any sub-sequence of steps, described with reference to the FIG. 2 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia, or any other country.

The invention is not restricted to the described embodiments in the figures, but may be varied freely within the scope of the claims.

The invention claimed is:

1. A computer system for visualizing computer graphics in at least one user client comprising:
    a primary user interface configured to receive data sets, each data set describing a three-dimensional graphics data structure in a respective source format,
    a primary memory configured to store the data sets,
    a secondary user interface configured to be connected to user clients, and in response to a respective request message, provides each client with access to at least one requested data set of the data sets stored in the primary memory,
    a viewer database containing software modules adapted to implement at least two different viewers, each viewer being configured to visualize the stored data sets on at least one type of user clients,
    an examining entity configured to:
        identify a respective graphics rendering capability of the at least one user client from which a request message has been received wherein the graphics rendering capability reflects at least one of a processing capacity and a memory capacity of the at least one user client, wherein the identifying the respective graphics rendering capability comprising:
            investigating whether or not the at least one data set requested by the at least one user client is already cached in the at least one user client, and if so, provide the at least one user client with access to the at least one data set requested based on contents of a relevant cache memory,
            in response to finding that the at least one data set request by the at least one user client is not already cached in the at least one user client:
                investigating whether or not the at least one user client is equipped with a viewer capable of visualizing the at least one data set requested by the at least one user client,
                forwarding an adequate software module, by a controller entity, to the at least one user client in response to finding that the at least one user client is incapable of visualizing the at least one requested data set, the adequate software module being installed in the at least one user client and adapted to implement a viewer which is configured to visualize the at least one requested data set on the at least one user client, and
                in response to finding that the at least one user client is capable of visualizing the at least one request data set, or to finding that the adequate software module is installed on the user client:
                    investigating whether or not the at least one user client is capable of rendering a source format of the at least one requested data set, and if not triggering a conversion entity to convert the at least one requested data set into a modified data set of a target format which the at least one user client can render, the target format being adapted to be visualized via at least one viewer installed in the at least one user client.

2. The system according to claim 1, comprising a secondary memory, and the controller entity is configured to cause a respective target-format version of any generated modified data set to be stored in the secondary memory.

3. The system according to claim 2, wherein, in response to the examining entity finding that the at least one user client is incapable of visualizing the at least one requested data set, the controller entity is configured to, before triggering the conversion entity to convert the at least one requested data set:
    search the secondary memory for a modified data-set version of the at least one requested data set which matches the graphics rendering capability of the at least one user client and, in response to finding the version:
        inhibit conversion of the at least one requested data set,
        cause the version of the modified data set to be read out from the secondary memory, and
        cause the version of the modified data set to be forwarded to the at least one user client.

4. The system according to claim 1, wherein the source format is based on Extensible Markup Language (XML).

5. The system according to claim 4, wherein the target format of the modified data set is a binary format representing a compressed version of at least one XML-file.

6. The system according to claim 5, wherein the conversion entity is configured to generate the modified data set in real time.

7. The system according to claim 4, wherein the control entity is configured to:
    cause symbolic graphics to be shown via a viewer in the at least one user client in response to user commands pertaining to desired manipulations of the at least one requested data set, the symbolic graphics schematically representing a three-dimensional graphics data structure of the at least one requested data set,
    cause the conversion entity to generate the modified data set in response to a confirmation command from the at least one user client, and
    forward the modified data set to the at least one user client, the modified data set representing a manipulation of the at least one requested data set being in agreement with a manipulation thereof indicated by the user commands and authorized by the confirmation command.

8. The system according to claim 4, wherein the control entity is configured to:
    cause the conversion entity to generate the version of the modified data set in the form of at least one of a video stream and static image data representing the at least one requested data set, and
    forward the modified data set to the user client.

9. A computer-implemented method of visualizing computer graphics in at least one user client, comprising:
    receiving data sets via a primary user interface of a computer system, each data set describing a three-dimensional graphics data structure in a respective source format,
    storing the data sets in a primary memory of the computer system,
    providing, in response to a respective request message from the at least one user client, the at least one user client with access to at least one requested data set of the data sets stored in the primary memory via a secondary user interface of the computer system,
    identifying a respective graphics rendering capability of the at least one user client from which the request message has been received, wherein the graphics rendering capability reflects at least one of a processing capacity and a memory capacity of the at least one user client, wherein the identifying the respective graphics rendering capability comprising:

investigating whether or not the at least one data set requested by the at least one user client is already cached in the at least one user client, and if so, providing the at least one user client with access to the at least one data set based on contents of a relevant cache memory, in response to finding that the at least one data set request by the at least one user client is not already cached in the at least one user client:

investigating whether or not the at least one user client is equipped with a viewer capable of visualizing the at least one data set requested by the at least one user client, and in response to finding that the at least one user client is incapable of visualizing the at least one requested data set:

forwarding an adequate software module to the at least one user client, the adequate software module being installed in the at least one user client and adapted to implement a viewer which is configured to visualize the at least one requested data set on the at least one user client; and in response to finding that the at least one user client is capable of visualizing the at least one request data set, or to finding that the adequate software module is installed on the user client:

investigating whether or not the at least one user client is capable of rendering a source format of the at least one requested data set, and if not, converting the at least one requested data set into a modified data set of a target format which the at least one user client can render, the target format being adapted to be visualized via at least one viewer installed in the at least one user client.

10. The method according to claim 9, comprising storing a respective target-format version of any generated modified data set in a secondary memory.

11. The method according to claim 10, wherein, in response to finding that the at least one user client is incapable of visualizing the requested data set before converting the at least one requested data set, the method further comprises:

searching the secondary memory for a modified data-set version of the at least one requested data set which matches the graphics rendering capability of the at least one user client, and in response to the version is found, inhibiting conversion of the at least one requested data set, reading out the version of the modified data set from the secondary memory and forwarding the version of the modified data set to the at least one user client.

12. The method according to claim 9, wherein the source format is based on Extensible Markup Language (XML).

13. The method according to claim 12, wherein the target format of the modified data set is a binary format representing a compressed version of at least one XML-file.

14. The method according to claim 13, comprising generating the modified data set in real time.

15. The method according to claim 12, comprising:

showing symbolic graphics via a viewer in the at least one user client in response to user commands pertaining to desired manipulations of the at least one requested data set, the symbolic graphics schematically representing a three-dimensional graphics data structure of the at least one requested data set, generating the modified data set in response to a confirmation command from the at least one user client, the modified data set representing a manipulation of the at least one requested data set being in agreement with a manipulation thereof indicated by the user commands and authorized by the confirmation command, and forwarding the modified data set to the at least one user client.

16. The method according to claim 12, comprising:

generating the version of the modified data set in the form of at least one of a video stream and static image data representing the at least one requested data set, and forwarding the version of the modified data set to the user client.

17. A non-transitory computer readable storage medium comprising computer-executable program code stored therein, the computer-executable program code configured for visualizing computer graphics in at least one user client, comprising:

a first executable portion configured to receive data sets via a primary user interface of a computer system, each data set describing a three-dimensional graphics data structure in a respective source format, a second executable portion configured to store the data sets in a primary memory of the computer system, a third executable portion configured to provide in response to a respective request message from the at least one user client, the at least one user client with access to at least one requested data set of the data sets stored in the primary memory via a secondary user interface of the computer system, a fourth executable portion configured to identify a respective graphics rendering capability of the at least one user client, wherein the graphics rendering capability reflects at least one of a processing capacity and a memory capacity of the at least one user client, wherein the identifying the respective graphics comprising:

investigating whether or not the at least one data set requested by the at least one user client is already cached in the at least one user client, and if so, providing the at least one user client with access to the at least one data set requested based on contents of a relevant cache memory, in response to finding that the at least one data set request by the at least one user client is not already cached in the at least one user client:

investigating whether or not the at least one user client is equipped with a viewer capable of visualizing the at least one data set requested by the at least one user client, in response to finding that the at least one user client is incapable of visualizing the at least one requested data set:

forwarding an adequate software module to the at least one user client, the adequate software module being installed in the at least one user client and adapted to implement a viewer which is configured to visualize the at least one requested data set on the at least one user client, and in response to finding that the at least one user client is capable of visualizing the at least one request data set, or to finding that the adequate software module is installed on the user client:

investigating whether or not the at least one user client is capable of render a source format of the at least one requested data set, and if not, converting the at least one requested data set into a modified data set of a target format which the at least one user client can render, the target format being adapted to be visualized via at least one viewer installed in the at least one user client.

* * * * *